(12) United States Patent
Patankar et al.

(10) Patent No.: US 10,769,470 B2
(45) Date of Patent: *Sep. 8, 2020

(54) METHOD AND SYSTEM FOR OPTIMIZING AN IMAGE CAPTURING BOUNDARY IN A PROPOSED IMAGE

(71) Applicant: Samsung Electronics Co., Ltd., Suwon-si, Gyeonggi-do (KR)

(72) Inventors: Anish Anil Patankar, Bangalore (IN); Rishi Prajapati, Ratlam (IN); Joy Bose, New Delhi (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/294,234

(22) Filed: Mar. 6, 2019

(65) Prior Publication Data

US 2019/0197333 A1 Jun. 27, 2019

Related U.S. Application Data

(63) Continuation of application No. 14/632,495, filed on Feb. 26, 2015, now Pat. No. 10,235,587.

(30) Foreign Application Priority Data

Mar. 4, 2014 (IN) .......................... 1091/CHE/2014

(51) Int. Cl.
*G06K 9/40* (2006.01)
*G06K 9/32* (2006.01)
*G06T 7/00* (2017.01)
*G06T 7/80* (2017.01)
(Continued)

(52) U.S. Cl.
CPC .............. *G06K 9/32* (2013.01); *G06T 1/0007* (2013.01); *G06T 7/0002* (2013.01); *G06T 7/80* (2017.01); *H04N 5/23222* (2013.01); *H04N 5/23293* (2013.01); *H04N 5/23296* (2013.01)

(58) Field of Classification Search
None
See application file for complete search history.

(56) References Cited

U.S. PATENT DOCUMENTS

| | | | |
|---|---|---|---|
| 5,663,762 A | 9/1997 | Nishiyama | |
| 6,685,366 B1 * | 2/2004 | Corbin | H04N 5/232 348/143 |
| 7,590,335 B2 | 9/2009 | Kobayashi et al. | |

(Continued)

*Primary Examiner* — Iman K Kholdebarin
(74) *Attorney, Agent, or Firm* — Jefferson IP Law, LLP

(57) ABSTRACT

A method and a system for optimizing an image capturing boundary in a proposed image for enhancing user experience while capturing an image are provided. The method includes locating an image capturing boundary in a proposed image and computing a composition measure for the image capturing boundary. Further, the method includes identifying at least one missing portion in the image capturing boundary based on the composition measure. Further, the method includes providing an indication, associated with an image capturing device, to optimize the image capturing boundary based on the identified at least one missing portion. Furthermore, the method includes computing an optimal zoom level automatically in response to actions performed by the user and captures the image by including the at least one missing portion.

20 Claims, 17 Drawing Sheets

(51) Int. Cl.
*G06T 1/00* (2006.01)
*H04N 5/232* (2006.01)

(56) References Cited

U.S. PATENT DOCUMENTS

| | | | |
|---|---|---|---|
| 8,068,694 B2 | 11/2011 | Zhang et al. | |
| 8,284,201 B2* | 10/2012 | Lindfors | G06T 3/40 |
| | | | 345/472 |
| 8,508,622 B1 | 8/2013 | Anon | |
| 8,817,161 B2 | 8/2014 | Hosoe | |
| 9,001,230 B2 | 4/2015 | Jirman | |
| 2001/0030693 A1* | 10/2001 | Fisher | H04N 5/23296 |
| | | | 348/218.1 |
| 2008/0198175 A1* | 8/2008 | Sun | G06T 7/12 |
| | | | 345/629 |
| 2008/0232788 A1* | 9/2008 | Piersol | H04N 5/23293 |
| | | | 396/50 |
| 2008/0253757 A1 | 10/2008 | Bells et al. | |
| 2009/0256925 A1* | 10/2009 | Yoshizumi | G06K 9/00221 |
| | | | 348/222.1 |
| 2010/0039535 A1* | 2/2010 | Maeda | H04N 5/23245 |
| | | | 348/240.2 |
| 2010/0110266 A1* | 5/2010 | Lee | H04N 5/23293 |
| | | | 348/333.02 |
| 2011/0188093 A1* | 8/2011 | Campbell | G06K 9/00 |
| | | | 358/474 |
| 2015/0334292 A1* | 11/2015 | Tartz | H04N 5/23219 |
| | | | 348/222.1 |
| 2016/0270648 A1* | 9/2016 | Freeman | A61B 3/12 |
| 2018/0027222 A1* | 1/2018 | Ogasawara | H04N 5/225 |
| | | | 348/175 |
| 2018/0249151 A1* | 8/2018 | Freeman | A61F 9/00 |
| 2019/0028645 A1* | 1/2019 | Satoh | H04N 5/23218 |
| 2019/0171201 A1* | 6/2019 | Tao | G05D 1/0094 |
| 2019/0197333 A1* | 6/2019 | Patankar | H04N 5/23296 |
| 2019/0385342 A1* | 12/2019 | Freeman | G06F 3/017 |

* cited by examiner

METHOD AND SYSTEM FOR OPTIMIZING AN IMAGE CAPTURING BOUNDARY IN A PROPOSED IMAGE

CROSS-REFERENCE TO RELATED APPLICATION(S)

This application is a continuation application of prior application Ser. No. 14/632,495, filed on Feb. 26, 2015, which was based on and claimed priority under 35 U.S.C. § 119(a) of an Indian patent application filed on Mar. 4, 2014 in the Indian Intellectual Property Office and assigned Serial number 1091/CHE/2014, the entire disclosure of which is hereby incorporated by reference.

TECHNICAL FIELD

The present disclosure relates to an image capturing device. More particularly, the present disclosure relates to improving results of image composition and providing an indication to capture missing portions to a user while capturing the image.

BACKGROUND

With the advent of relatively inexpensive image and video capturing devices, such as cameras, or integrated devices, such as still/video camera features of mobile phones, and the like, there has been a greater expectation of being able to take images and videos at many more locations. Implementing an automatic optimal zoom for capturing an image is a significant consideration for a designer and a manufacturer of a contemporary image capturing device. With the automatic optimal zoom feature in the image capturing device, even an amateur understands some aspects of photography.

Image capturing devices of the related art consider a foreground region and a background region, such as a prominent building, a landscape, and the like, while capturing the image and automatically zoom in on a region of interest. In automatic zoom enabled image capturing devices of the related art, a user of the image capturing device needs to manually identify a missing region in a field of view of the image capturing device and adjust the image capturing device to capture the missing region while capturing the image. For example, when a prominent building is present behind a region of interest, then the user needs to manually identify the prominent building and adjust the image capturing device to capture the prominent building along with the region of interest.

In another example of the related art, when a person is selected as the region of interest and a portion of a face is missing in the field of view, the user has to manually identify the missing face and adjust the image capturing device to include the missing face while capturing the image.

The major shortcoming of the method of the related art is that the automatic zoom provided by the image capturing device does not recommend the user to capture missing portions or regions in the field of view while capturing the image.

Therefore, a need exists for improving results of image composition and providing an indication to capture missing portions to a user while capturing the image.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an indication of a missing portion in a proposed image to a user.

Another aspect of the present disclosure is to provide a method and a system to provide an automatically optimal zoom level including a missing portion in a proposed image.

In accordance with an aspect of the present disclosure, a method for optimizing an image capturing boundary in a proposed image is provided. The method includes locating an image capturing boundary in a proposed image, computing a composition measure for the image capturing boundary, identifying at least one missing portion in the image capturing boundary based on the composition measure, and providing an indication, associated with the image capturing device, to optimize the image capturing boundary based on the identified at least one missing portion.

In accordance with another aspect of the present disclosure, a device for optimizing an image capturing boundary in a proposed image is provided. The device includes an integrated circuit, including a processor, and a memory. The memory includes a computer program code within the integrated circuit. The memory and the computer program code with the processor configured to instruct the device to locate an image capturing boundary in a proposed image. Further the device is configured to compute a composition measure for the image capturing boundary, to identify at least one missing portion in the image capturing boundary based on the composition measure, and to provide an indication, associated with the image capturing device, to optimize the image capturing boundary based on the identified at least one missing portion.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
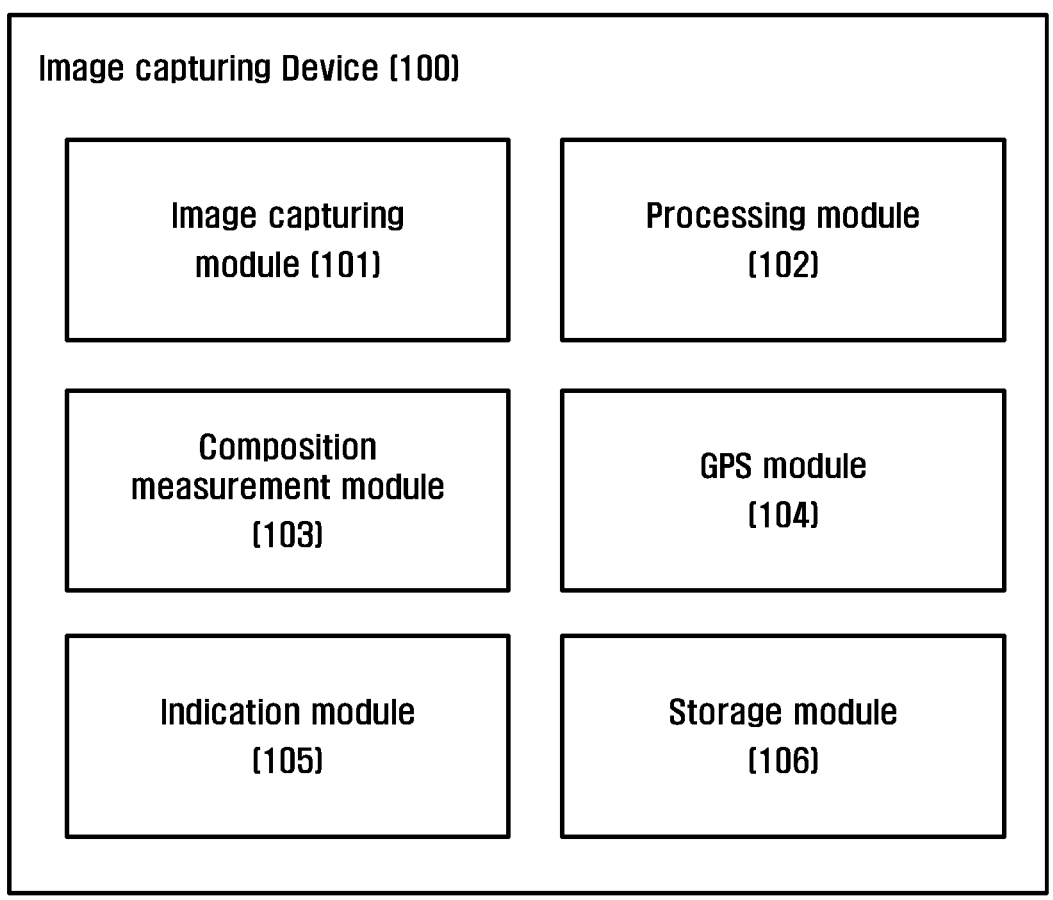
FIG. 1 illustrates a plurality of modules in an image capturing device to optimize an image capturing boundary in a proposed image according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Prior to describing the embodiments of the present disclosure, it is useful to provide definitions for key terms and concepts used herein. Unless defined otherwise, all technical and scientific terms used herein have the same meaning as commonly understood by a personal having ordinary skill in the art to which this disclosure belongs.

Proposed image: Image that is not captured by an image capturing device, however visible through lens and displayed in a view finder.

Image capturing boundary: Refers to a region before the lens of the image capturing device which may include one or more Region of Interest (ROIs). If the ROI is not selected, then the entire field of view of the image capturing device is selected as image capturing boundary.

Composition measure: Refers to an independent value for some characteristic of the proposed image and provide an indication that might not be optimal for one characteristic versus another characteristic. The image capturing device might provide guides on a viewfinder to, for example, divide the image into a three-by-three array so that the user can position one or more subjects at one of the corners formed by that array (i.e., follow the "rule of thirds").

Guard space: Refers to a boundary space considered around a selected ROI), which is maintained as a constant space while computing the optimal zooming level.

The various embodiments herein achieve a method and system to optimize an image capturing boundary in a proposed image. An image capturing device captures the proposed image and a user view the proposed image through a view finder. The method includes locating an image capturing boundary in the proposed image. Further, the method includes computing composition measure for the image capturing boundary. For example, the image capturing boundary can include one or more ROIs. For example, the ROI includes, but is not limited to, a foreground object, a background object, a moving object, and any prominent object in the field of view of the image capturing device. The method includes identifying one or more missing portions in the image capturing boundary based on the composition measure. For example, the method detects the prominent building automatically and identifies the missing portions of the building in the field of view of the image capturing device. Further, the missing portions can be identified by comparing other images of the same building with the image in the field of view. In an embodiment of the present disclosure, the prominent building can be detected by using suitable techniques, such as, but is not limited to a Global Positioning System (GPS). In an embodiment of the present disclosure, other images of the detected prominent building can be obtained from a cloud. Further, the method includes providing an indication to the user. For example, the method provides suggestions to the user to change the orientation of the image capturing device to capture the one or more missing portions.

For example, the method may provide graphical indications, such as arrows, and the like, and/or verbal suggestions in the field of view alerting the user to capture the missing portion. Furthermore, the method analyzes one or more objects being selected by the user and provides the parameters for computing the automatic optimal zoom level. Furthermore, the method computes automatic optimal zoom level in response to the actions performed by the user on the image capturing device based on the provided indication. Further, the method includes capturing the image by applying the computed automatic optimal zoom level in the image capturing device.

Unlike systems of the related art, the method provides automated optimal zoom level by suggesting the user to capture the missing portions or regions in the field of view while capturing the image. Thus, the method enhances the user experience while capturing the image by providing the automated zoom level with the recommendations instantly.

In an embodiment of the present disclosure, a user can select or deselect ROI in the field of view of the image capturing device by performing a gesture around the required region.

In an embodiment of the present disclosure, the gesture can be at least one of a tap gesture, a swipe gesture, a scroll gesture, and a hover gesture, a gaze, selecting one or more objects using a physical button in the image capturing device.

In an embodiment of the present disclosure, if none of region is selected as ROI, the method includes identifying missing portions in the entire field of view of the image capturing device.

In an embodiment of the present disclosure, the missing portion in the field of view can be the foreground object, the background object, the moving object, the prominent object, a threshold space for the object, a positioning of object, and the like.

In an embodiment of the present disclosure, if none of the objects are selected in the image capturing device, the method sets the optimal zooming level by considering all the objects displayed within the field of view of the image capturing device.

In an embodiment of the present disclosure, an image capturing device includes, but is not limited to, a digital camera, mobile phone, smart phone, tablet, Personal Digital Assistant (PDA), or any electronic device capable of capturing the image.

In an embodiment of the present disclosure, the parameters related to the selected one or more objects can be the foreground object in the field of view, the background object in the field of view, the moving object in the field of view, the prominent object in the field of view, a threshold space for the object, a positioning of object in the field of view, and the like.

Referring now to the drawings, and more particularly to FIGS. 1 through 11, where similar reference characters denote corresponding features consistently throughout the figures, various embodiments of the present disclosure are presented.

FIG. 1 illustrates a plurality of modules in an image capturing device to optimize an image capturing boundary in a proposed image according to various embodiments of the present disclosure.

Referring to FIG. 1, in an embodiment of the present disclosure, an image capturing device 100 comprises an image capturing module 101, a processing module 102, a composition measurement module 103, a GPS module 104, an indication module 105, and a storage module 106. The image capturing device 100 allows the user to select or deselect ROI from the proposed image before capturing the image.

In an embodiment of the present disclosure, the image capturing device 100 identifies the characteristics of the proposed image. In an embodiment of the present disclosure, characteristics can be a geographic location, a preference obtained from the user, ambient conditions (indoor/outdoor), and past actions of the user.

For example, the GPS module 104 in the image capturing device 100 is configured to identify the location of the proposed image. In another example, when a prominent object is present in the proposed image, then the GPS module 104 identifies the location of the prominent building.

In an embodiment of the present disclosure, the image capturing device 100 allows the user to select characteristics of the proposed image for computing an automatic optimal zooming level before capturing the image. For example, the characteristics of the proposed image can be, but is not limited to, a pre-configured mode, such as a group photo mode, an indoor mode, an outdoor mode, and the like.

The image capturing module 101 is configured to capture the proposed image in the field of view of the image capturing device 100.

The processing module 102 can be configured to locate the image capturing boundary in the proposed image. In an embodiment of the present disclosure, the image capturing boundary can include one or more ROIs. In an embodiment of the present disclosure, if there is no ROI, then the processing module 102 is configured to select the entire field of view as image capturing boundary. For example, the ROI can be, but is not limited to, a foreground object, a background object, a moving object, and any prominent object in the field of view of the image capturing device 100. Further, the processing module 102 can be configured to compute the optimal zoom level automatically based on a framing area of the objects present in the field of view.

In an embodiment of the present disclosure, the processing module 102 can be configured to compute the framing area based on parameters, such as, but is not limited to, a number of people, a mode of operation of the image capturing device 100 (indoor/outdoor), and the like.

In an embodiment of the present disclosure, the processing module 102 can be configured to compute the optimal zoom level automatically in response to the actions performed on the image capturing device 100.

In an embodiment of the present disclosure, if the user accepts the indications provided by the image capturing device 100, the processing module 102 can be configured to compute the automatic optimal zoom level by including the missing portions in the proposed image.

In an embodiment of the present disclosure, if the user rejects the indications provided by the image capturing device 100, the processing module 102 can be configured to compute the automatic optimal zoom level by excluding the missing portions in the proposed image.

In an embodiment of the present disclosure, the processing module 102 can be configured to provide the automatic optimal zoom level such that the image capturing boundary is positioned properly within the proposed image.

In an embodiment of the present disclosure, the processing module 102 can be configured to increase the zoom level of the image capturing device 100 by leaving guard space around the image capturing boundary.

Further, the processor module 102 can be configured to capture the proposed image with the computed automatic optimal zoom level.

The composition measurement module 103 can be configured to compute composition measure for the image capturing boundary.

In an embodiment of the present disclosure, composition measurement can be computed by the composition measurement module 103 by providing guides on a viewfinder to, divide the image capturing boundary into a three-by-three array and can determine position of one or more subjects at one of the corners formed by that array (rule of thirds). For example, the frame of the proposed image can be divided into thirds horizontally, a top third, a middle third and a bottom third. Further, the proposed image can be divided into thirds vertically, a left, a center and a right which creates a 3 by 3 grid. A stronger composition measurement can be done by placing the ROI on one or more of the lines created in the grid.

Furthermore, the composition measurement module 103 is configured to identify one or more missing portions in the image capturing boundary based on the composition measure. For example, the image capturing boundary includes faces. The composition measurement module 103 is configured to detect the faces automatically and identifies the missing portions of the faces in the field of view of the image capturing device 100. For example, the composition measurement module 103 detects the prominent building automatically and identifies the missing portions of the building in the field of view of the image capturing device 100. Further, the missing portions can be identified by comparing the proposed image with other images of the same prominent building.

In an embodiment of the present disclosure, the prominent building can be detected by using suitable techniques, such as, but is not limited to, a GPS. In an embodiment of the present disclosure, other images of the detected prominent building can be obtained from a cloud storage/database. In that case, the image capturing device 100 communicates with the cloud storage using a communication interface module.

In an embodiment of the present disclosure, the other images of the prominent building can be obtained from the storage module 106.

The indication module 105 is configured to provide an indication to the user associated with the image capturing device 100 wherein the indication is to optimize the image capturing boundary based on identified at least one missing portion. For example, the indication module 105 is configured to provide graphical indications (e.g., arrows) in the about the missing portion in the proposed image. In an embodiment of the present disclosure, the indications include providing suggestions, such as a visual, an audio, a tactile display, and the like, that can be displayed in the proposed image about the missing portion in the proposed image. For example, the image capturing device 100 may suggest the user: to tilt the image capturing device 100 upwards or downwards, to move the user forward or backward to the ROI, to move the image capturing device 100 away from the ROI, and the like. In an embodiment of the present disclosure, the visual suggestion can be directional to optimize the image capturing boundary. In an embodiment of the present disclosure, the indication module 105 can be configured to determine whether the user has accepted the indications provided to capture the missing portion in the proposed image.

The storage module 106 can be configured to pre-store the images of the prominent buildings and a captured image.

Figure 2:
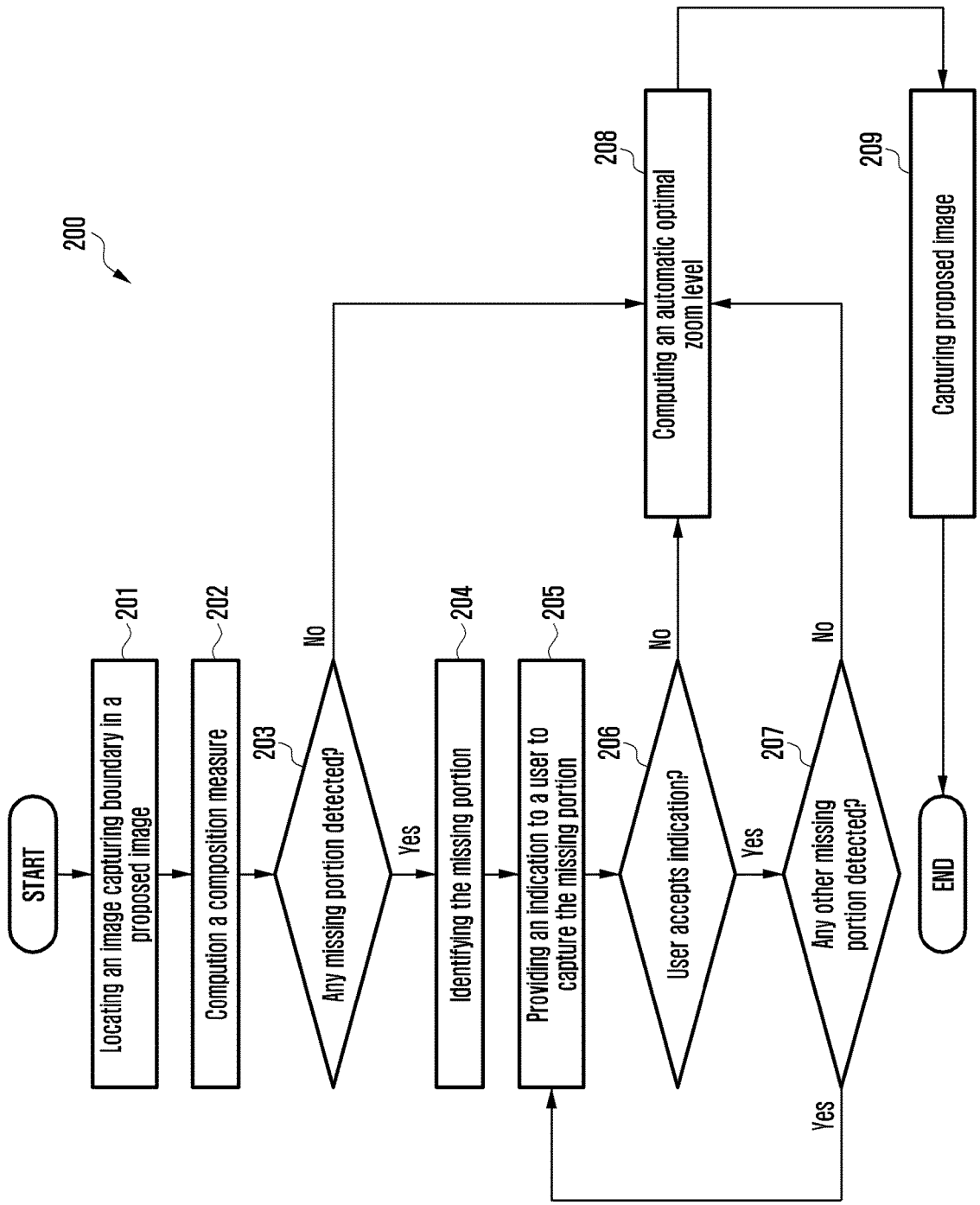
FIG. 2 is a flowchart illustrating a method for optimizing an image capturing boundary in a proposed image by providing an indication of a missing portion in the proposed image according to various embodiments of the present disclosure.

FIG. 2 is a flowchart illustrating a method for optimizing an image capturing boundary in a proposed image by providing an indication of a missing portion in the proposed image according to various embodiments of the present disclosure.

Referring to FIG. 2, at operation 201, a method 200 includes locating an image capturing boundary in the proposed image of the image capturing device 100. In an embodiment of the present disclosure, the method 200 allows the processing module 102 to locate the image capturing boundary in the proposed image of the image capturing device 100. In an embodiment of the present disclosure, the image capturing boundary may include one or more ROIs that are selected by the user associated with the image capturing device 100. For example, the ROI can be, but is not limited to, a foreground object, a background object, a moving object, and any prominent object in the field of view of the image capturing device 100. If the ROI is not selected, then the entire field of view of the image capturing device 100 is selected as image capturing boundary. The processing module 102 can be configured to locate an image capturing boundary in the proposed image by initializing the image capturing device 100 with a wide zoom level. Further, the processing module 102 can be configured to locate an image capturing boundary by identifying characteristics of the proposed image.

In an embodiment of the present disclosure, the characteristics can be a geographic location, a preference obtained from the user, ambient conditions (indoor/outdoor), past actions of the user. For example, the GPS module 104 in the image capturing device 100 is configured to identify the location of the proposed image. In another example, when a prominent object is present in the proposed image, then the GPS module 104 identifies the location of the prominent building. For example, based on the past user actions, the processing module 102 may change the zoom levels depending on picture profile, such as when the user increases the zoom levels for images where only one or two people are present. In another example, based on the past user actions, the processing module 102 may augment specific parts of the proposed image by zooming and merging, such as the regions of the image containing other people.

At operation 202, the method 200 includes computing a composition measure for the located image capturing boundary in the proposed image. In an embodiment of the present disclosure, the method 200 allows the composition measurement module 103 to compute the composition measure for the image capturing boundary in the proposed image. The composition measurement module 103 is configured to compute the composition measure by determining whether the image capturing boundary is positioned within a defined area in the proposed image. Further, the composition measurement module 103 is configured to compute the composition measure in response to determining that the image capturing boundary is not positioned within the defined area. For example, the composition measurement module 103 can provide guides on a viewfinder to, divide the image capturing boundary into a three-by-three array and can determine position of one or more subjects at one of the corners formed by that array (rule of thirds).

At operation 203, the method 200 includes determining whether there is any missing portion in the image capturing boundary of the image capturing device 100. In an embodiment of the present disclosure, the method 200 allows the composition measurement module 103 to determine whether there is any missing portion in the proposed image of the image capturing device 100. Further, the composition measurement module 103 can be configured to determine the missing portion in the proposed image by using techniques, such as, but is not limited to, edge detection, face detection, and the like.

At operation 204, the method 200 includes identifying the missing portion in the image capturing boundary of the proposed image. In an embodiment of the present disclosure, the method 200 allows the composition measurement module 103 to identify the detected missing portion in the image capturing boundary of the image capturing device 100 by using the computed composition measure.

At operation 205, the method 200 includes providing an indication to the user associated with the image capturing device 100 to capture the missing portion in the image capturing boundary of the proposed image. In an embodiment of the present disclosure, the method 200 allows the indication module 105 to provide indications to the user associated with the image capturing device 100 to capture the missing portion in the proposed image. The indication module 105 is configured to provide the indication to the user associated with the image capturing device 100, to optimize the image capturing boundary based on identified at least one missing portion.

In an embodiment of the present disclosure, the indications include providing suggestions, such as a visual, an audio, a tactile display, and the like, that can be displayed in the proposed image about the missing portion in the proposed image. For example, the method 200 provides suggestions to the user to change the orientation of the image capturing device 100 to capture the one or more missing portions. For example, the image capturing device 100 may suggest the user: to tilt the image capturing device 100 upwards or downwards, to move the user forward or backward to the ROI, to move the image capturing device 100 away from the ROI, and the like.

In an embodiment of the present disclosure, the visual suggestion can be directional to optimize the image capturing boundary. For example, if upper regions of the human face are missing, then the missing portions of the face are suggested by upward arrows.

At operation 206, the method 200 includes determining whether the user accepted the suggestions that are provided to optimize the image capturing boundary in the proposed image. In an embodiment of the present disclosure, the method 200 allows the indication module 105 to determine whether the user accepted the indications that are provided to capture the missing portion in the proposed image.

At operation 207, the method 200 includes determining whether there is any other missing portion is detected in the image capturing boundary of the proposed image. In an embodiment of the present disclosure, the method 200 allows the composition measurement module 103 to determine whether there is any other missing portion in the proposed image if the user accepts the indications. Further, the method 200 repeats the operations from 205 if there is any other missing portion detected in the image capturing boundary of the proposed image.

At operation 208, the method 200 includes computing an automatic optimal zoom level in response to determining that there is no other missing portion in the image capturing boundary of the proposed image. In an embodiment of the present disclosure, the method 200 allows the processing module 102 to compute the automatic optimal zoom level in response to determining that there is no other missing portion in the image capturing boundary of the proposed image.

At operation 209, the method 200 includes capturing the proposed image by including the missing portion in the computed automatic optimal zoom level. In an embodiment of the present disclosure, the method 200 allows the processing module 102 to capture the proposed image by including the missing portion in the computed automatic optimal zoom level.

If at operation 206, it is determined that the user did not accepts the indication provided to optimize the image capturing boundary in the proposed image, then at operation 208 the method 200 includes computing an automatic optimal zoom level. In an embodiment of the present disclosure, the method 200 allows the processing module 102 to compute the automatic optimal zoom level. Further, at operation 209 the method 200 includes capturing the proposed image by excluding the missing portion in the computed automatic optimal zoom level if user did not accepts the indication provided. In an embodiment of the present disclosure, the method 200 allows the processing module 102 to capture the proposed image by excluding the missing portion in the computed automatic optimal zoom level if user did not accepts the indication provided.

At operation 203, the method 200 includes computing an optimal zoom level automatically if there is no missing portion detected in the image capturing boundary of the proposed image. In an embodiment of the present disclosure, the method 200 allows the processing module 102 to compute the optimal zoom level automatically if there is no missing portion detected in the image capturing boundary of the proposed image.

The various actions, acts, blocks, operations, and the like, in method 200 may be performed in the order presented, in a different order or simultaneously. Further, in various embodiments of the present disclosure, some actions, acts, blocks, operations, and the like, may be omitted, added, modified, skipped, and the like, without departing from the scope of the present disclosure.

Figure 3:
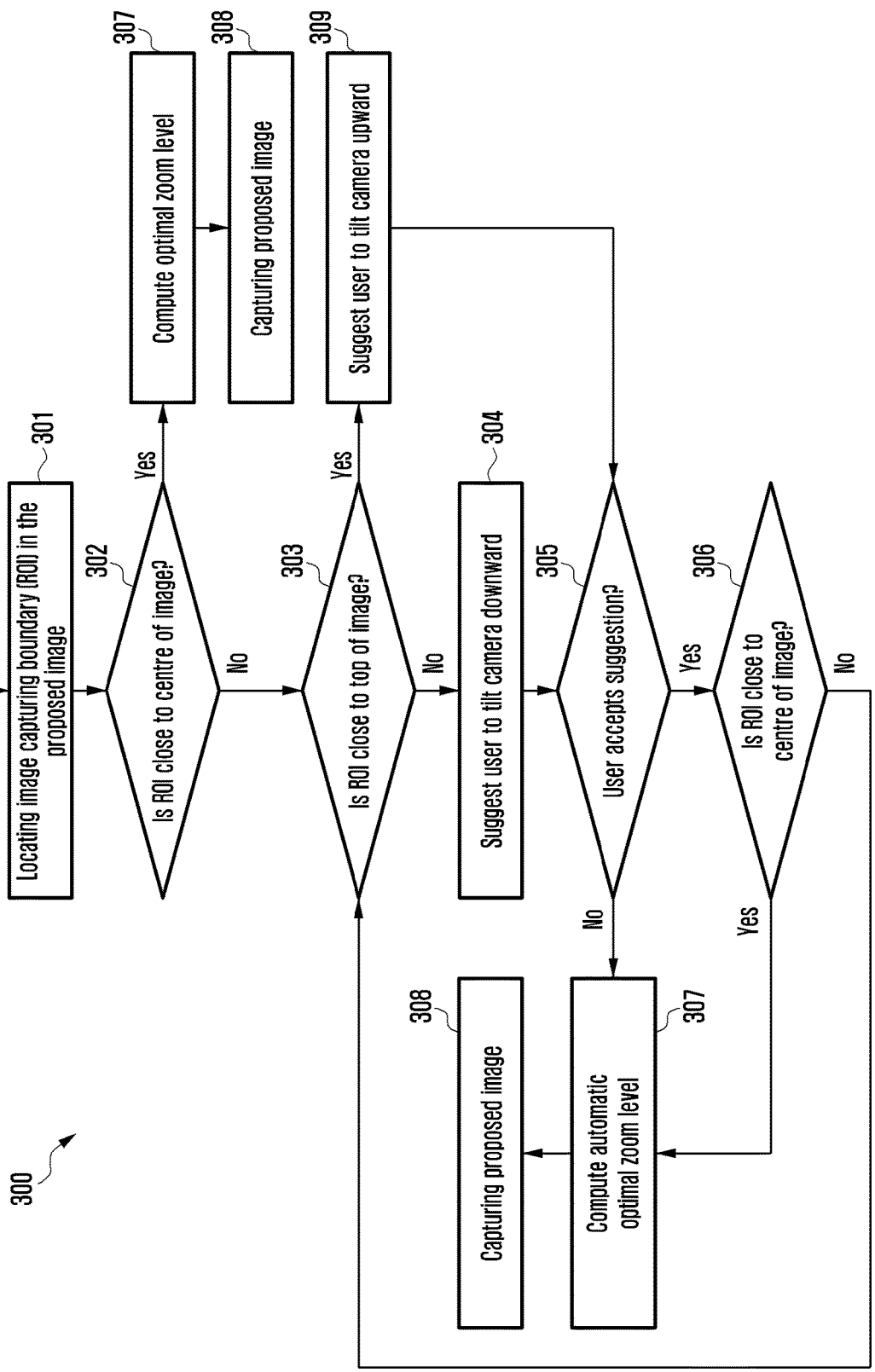
FIG. 3 is a flowchart illustrating a method for providing a suggestion to a user to change an orientation of an image capturing device to include a missing portion in a proposed image according to various embodiments of the present disclosure.

FIG. 3 is a flowchart illustrating a method for providing a suggestion to a user to change an orientation of an image capturing device to include a missing portion in a proposed image according to various embodiments of the present disclosure.

Referring to FIG. 3, at operation 301, a method 300 includes locating an image capturing boundary ROI in the proposed image of the image capturing device 100. In an embodiment of the present disclosure, the method 300 allows the processing module 102 to locate an image capturing boundary in the proposed image of the image capturing device 100. In an embodiment of the present disclosure, the image capturing boundary can include one or more ROIs. In an embodiment of the present disclosure, if there is no ROI, then the processing module 102 is configured to select the entire field of view as image capturing boundary. For example, the ROI can be, but is not limited to, a foreground object, such as a face, and the like, a background object, such as a tree, and the like, a moving object, and any prominent object in the field of view of the image capturing device 100. The processing module 102 can be configured to locate an image capturing boundary in the proposed image by initializing the image capturing device 100 with a wide zoom level. Further, the processing module 102 can be configured to locate an image capturing boundary by identifying characteristics of the proposed image. For example, the characteristics of the proposed image can be, but is not limited to, a geographic location, a preference obtained from the user, ambient conditions (indoor/outdoor), past actions of the user.

The method 300 further includes increasing the zoom level of the image capturing device 100 leaving a pre-defined guard space around the ROI. In an embodiment of the present disclosure, the method 300 allows the processing module 102 to increase the zoom level of the image capturing device 100 leaving the guard space around the ROI.

At operation 302, the method 300 includes computing a composition measure by determining whether the ROI is close to center of the field of view of the image capturing device 100 after leaving the guard space around the ROI. The method 300 allows the composition measurement module 103 to determine whether the ROI is close to the center of the field of view of the image capturing device 100. The composition measurement module 103 is configured to compute the composition measure by determining whether the image capturing boundary is positioned within a defined area in the proposed image. Further, the composition measurement module 103 is configured to compute the composition measure in response to determining that the image capturing boundary is not positioned within the defined area. For example, the composition measurement module 103 can provide guides on a viewfinder to, divide the image capturing boundary into a three-by-three array and can determine position of one or more subjects at one of the corners formed by that array (rule of thirds).

At operation 303, the method 300 includes computing a composition measure by determining whether the ROI is close to top of the field of view of the image capturing device 100 if the ROI is not close to the center of the field of view of the image. In an embodiment of the present disclosure, the method 300 allows the composition measurement module 103 to compute the composition measure by determining whether the face or the ROI is close to top of the field of view of the image capturing device 100 if the ROI is not close to the center of the field of view of the image.

At operation 304, the method 300 includes suggesting the user to tilt the image capturing device 100 downwards if the face or the ROI is not close to the top of the field of view of the image capturing device 100. In an embodiment of the present disclosure, the method 300 allows the indication module 105 to suggest the user to tilt the image capturing device 100 downwards if the ROI is not close to the top of the field of view of the image capturing device 100. For example, the suggestions can be a visual, an audio, a tactile display, and the like. In an embodiment of the present disclosure, the visual suggestion can be directional to optimize the image capturing boundary.

At operation 305, the method 300 includes determining whether the user accepted the suggestions that are provided to optimize the image capturing boundary in the proposed image. In an embodiment of the present disclosure, the method 300 allows the indication module 105 to determine whether the user accepted the indications that are provided to capture the missing portion in the proposed image.

At operation 306, the method 300 includes computing a composition measure by determining whether the ROI is close to center of the field of view of the image capturing device 100 if the user accepts the suggestion provided to capture the missing portion. In an embodiment of the present disclosure, the method 300 allows the composition measurement module 103 to determine whether the ROI is close to the center of the field of view of the image capturing device 100 if the user accepts the suggestion provided to capture the missing portion. Further, determining whether the ROI is close to the center of the field of view of the missing portions can be done only after the user has performed actions to capture the missing ROI.

At operation 307, the method 300 includes computing an automatic optimal zoom level in response to determining that the ROI is close to the center of the field of view of the proposed image. In an embodiment of the present disclosure, the method 300 allows the processing module 102 to compute the automatic optimal zoom level in response to determining that the ROI is close to the center of the field of view of the proposed image.

At operation 308, the method 300 includes capturing the proposed image by including the missing portion with the computed automatic optimal zoom level. In an embodiment of the present disclosure, the method 300 allows the processing module 102 to capture the proposed image by including the missing portion with the computed automatic optimal zoom level.

Further, at operation 306, the method 300 includes repeating the operations from 303 if the ROI is not close to the center of the field of view of the proposed image.

At operation 309, the method 300 includes suggesting the user to tilt the image capturing device 100 upwards if the ROI is close to the top of the field of view of the image capturing device 100. In an embodiment of the present disclosure, the method 300 allows the composition indication module 105 to suggest the user to tilt the image capturing device 100 upwards if the ROI is close to the top of the field of view of the image capturing device 100. Further, the method 300 includes repeating the operations from 305 after completing the operation 310.

At operation 305, the method 300 includes computing an automatic optimal zoom level if user did not accepts the indication provided to optimize the image capturing boundary in the proposed image. In an embodiment of the present disclosure, the method 300 allows the processing module 102 to compute an automatic optimal zoom level if user did not accepts the indication provided to optimize the image capturing boundary in the proposed image. Further, at operation 308 the method 300 includes capturing the proposed image by excluding the missing portion in the computed automatic optimal zoom level if user did not accepts the indication provided. In an embodiment of the present disclosure, the method 300 allows the processing module 102 to capture the proposed image by excluding the missing portion in the computed automatic optimal zoom level if user did not accepts the indication provided.

At operation 302, the method 300 includes repeating the operations 307 and 308 if ROI is close to center of the field of view of the image capturing device 100 after leaving the guard space around the ROI. In an embodiment of the present disclosure, the method 300 allows the processing module 102 to repeat the operations 307 and 308 if ROI is close to center of the field of view of the image capturing device 100 after leaving the guard space around the ROI.

The various actions, acts, blocks, operations, and the like, in method 300 may be performed in the order presented, in a different order or simultaneously. Further, in various embodiments of the present disclosure, some actions, acts, blocks, operations, and the like, may be omitted, added, modified, skipped, and the like, without departing from the scope of the present disclosure.

Figure 4:
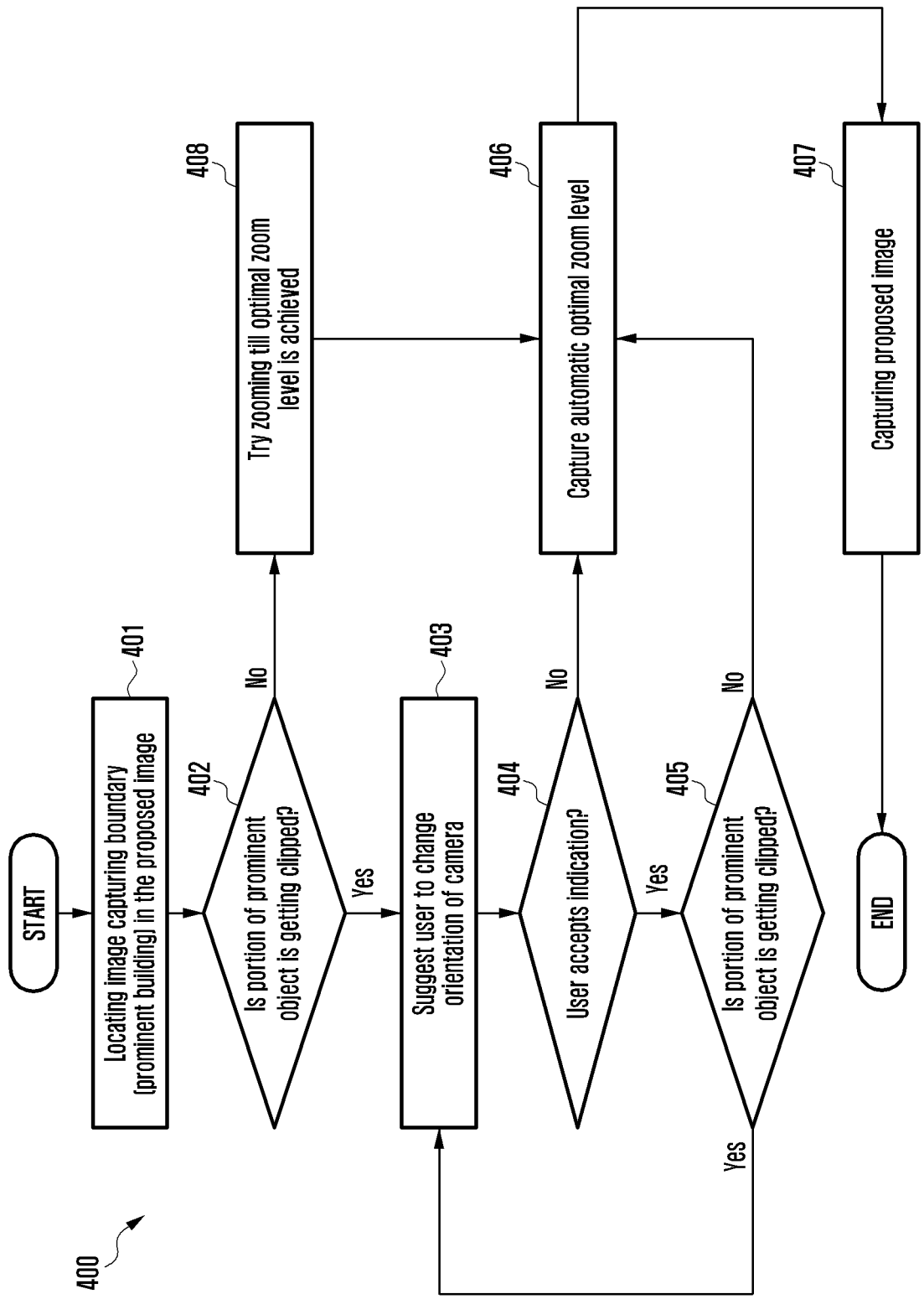
FIG. 4 is a flowchart illustrating a method for providing a suggestion to a user to adjust an image capturing device to include a missing portion in a proposed image according to various embodiments of the present disclosure.

FIG. 4 is a flowchart illustrating a method for providing a suggestion to a user to adjust an image capturing device to include a missing portion in a proposed image according to various embodiments of the present disclosure.

Referring to FIG. 4, at operation 401, a method 400 includes locating an image capturing boundary in the proposed image of the image capturing device 100. In an embodiment of the present disclosure, the method 400 allows the processing module 102 to locate the image capturing boundary in the proposed image of the image capturing device 100. In an embodiment of the present disclosure, the image capturing boundary may include one or more ROIs that are selected by the user associated with the image capturing device 100. For example, the ROI can be any prominent building in the field of view of the image capturing device 100. The processing module 102 can be configured to locate the image capturing boundary in the proposed image by initializing the image capturing device 100 with a wide zoom level. Further, the processing module 102 can be configured to locate the image capturing boundary by identifying characteristics of the proposed image. For example, the characteristics can be a geographic location, a preference obtained from the user, ambient conditions (indoor/outdoor), past actions of the user. The GPS module 104 is configured to identify location of the prominent building in the field of view of the image capturing device 100.

At operation 402, the method 400 includes computing a composition measure by determining whether the portion of the prominent building is getting clipped in the proposed image. In an embodiment of the present disclosure, the method 400 allows the composition measurement module 103 to determine whether the portion of the prominent building is getting clipped in the proposed image. The composition measurement module 103 is configured to compute the composition measure by determining whether the image capturing boundary is positioned within a defined area in the proposed image. Further, the composition measurement module 103 is configured to compute the composition measure in response to determining that the image capturing boundary is not positioned within the defined area. For example, the composition measurement module 103 can provide guides on a viewfinder to, divide the image capturing boundary into a three-by-three array and can determine position of one or more subjects at one of the corners formed by that array (rule of thirds). For example, the composition measurement module 103 may use techniques, such as, but is not limited to, edge detection.

At operation 403, the method 400 includes suggesting the user to change the orientation of the image capturing device 100 if the portion of the prominent building is getting clipped. In an embodiment of the present disclosure, the method 400 allows the indication module 105 to suggest the user to change the orientation of the image capturing device 100 if the portion of the prominent building is getting clipped. For example, the orientation can be, but is not limited to, tilting the image capturing device 100 upwards, downwards, and the like. For example, if the peak of the prominent building is missing, the indication module 105 provides suggestions, such as a visual, an audio, a tactile display, and the like, in the proposed image.

At operation 404, the method 400 includes determining whether the user accepted the suggestions that are provided to optimize the image capturing boundary in the proposed image. In an embodiment of the present disclosure, the method 400 allows the indication module 105 to determine whether the user accepted the indications that are provided to capture the missing portion in the proposed image.

At operation 405, the method 400 includes computing a composition measure by determining again whether the portion of the prominent building is getting clipped in the proposed image. In an embodiment of the present disclosure, the method 400 allows the composition measurement module 103 to determine whether again the portion of the prominent building is getting clipped in the proposed image. Further, determining whether the portion of the prominent building is getting clipped in the proposed image can be done only after the user has performed actions to capture the clipped portion.

At operation 406, the method 400 includes computing an automatic optimal zoom level in response to determining that the portion of the prominent building is not clipped in the proposed image. In an embodiment of the present disclosure, the method 400 allows the processing module 102 to compute the automatic optimal zoom level in response to determine that the portion of the prominent building is not clipped in the proposed image.

At operation 407, the method 400 includes capturing the proposed image by including the clipped portion with the computed automatic optimal zoom level. In an embodiment of the present disclosure, the method 400 allows the processing module 102 to capture the proposed image by including the clipped portion with the computed automatic optimal zoom level.

Further, at operation 405, the method 400 includes repeating the operations from 403 if the portion of the prominent building is getting clipped in the proposed image.

At operation 404, the method 400 includes computing an automatic optimal zoom level if user did not accepts the indication provided to optimize the image capturing boundary in the proposed image. In an embodiment of the present disclosure, the method 400 allows the processing module 102 to compute an automatic optimal zoom level if user did not accepts the indication provided to optimize the image capturing boundary in the proposed image. Further, at operation 406 the method includes capturing the proposed image by excluding the clipped portion in the computed automatic optimal zoom level if the user did not accepts the indication provided. In an embodiment of the present disclosure, the method 400 allows the processing module 102 to capture the proposed image by excluding the clipped portion in the computed automatic optimal zoom level if user did not accepts the indication provided.

At operation 408, the method 400 includes trying zooming till automatic optimal zoom level is achieved if there is no clipped portion detected in the located prominent building. The method 400 allows the processing module 102 to try zooming till optimal zoom level is achieved if there is no clipped portion detected in the located prominent building. Further, the method 400 continues from operation 406 after trying zooming till automatic optimal zoom level is achieved.

The various actions, acts, blocks, operations, and the like, in method 400 may be performed in the order presented, in a different order or simultaneously. Further, in various embodiments of the present disclosure, some actions, acts, blocks, operations, and the like, may be omitted, added, modified, skipped, and the like, without departing from the scope of the present disclosure.

Figure 5:
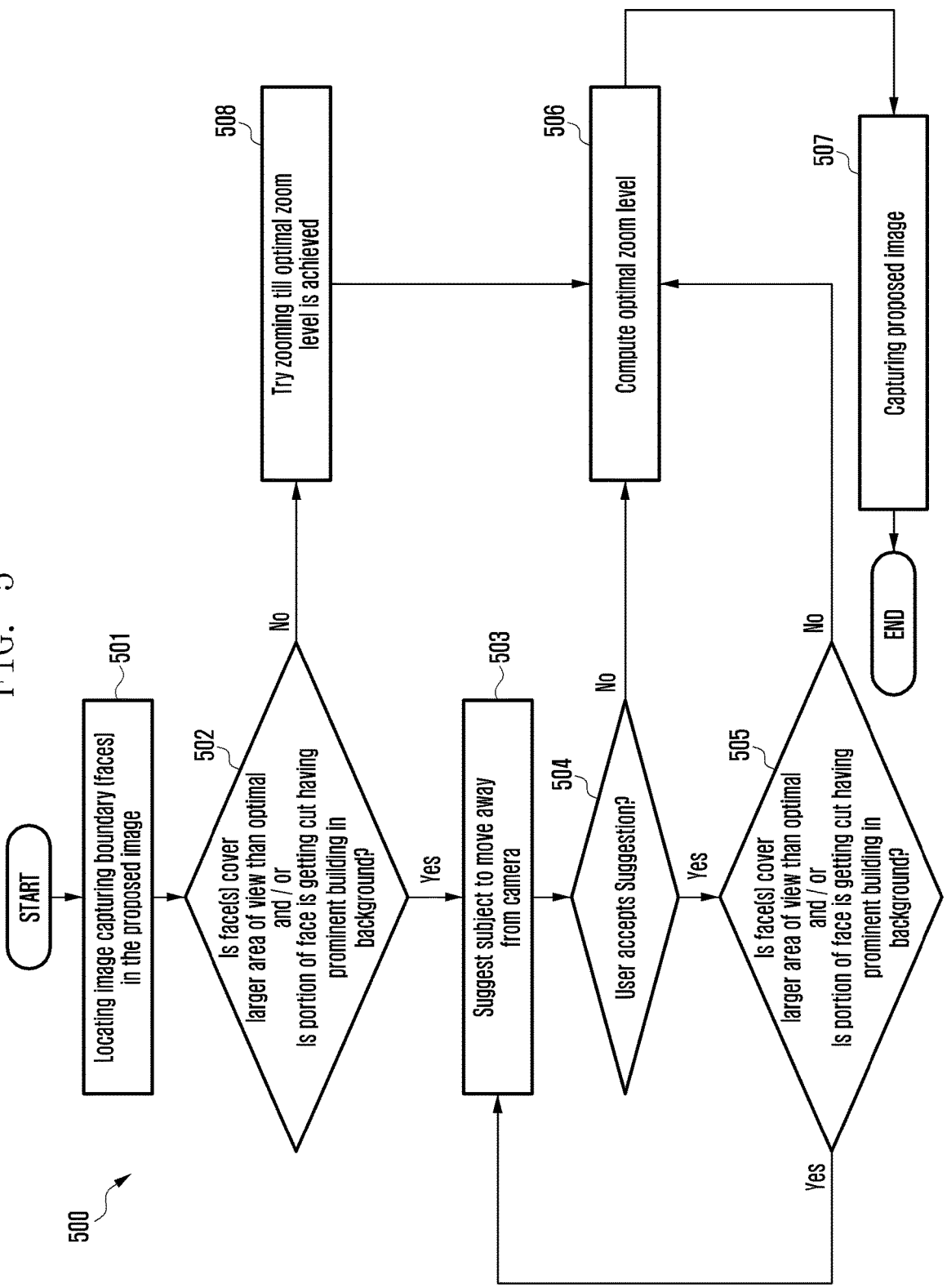
FIG. 5 is a flowchart illustrating a method for providing a suggestion to a user to move a subject away from an image capturing device according to various embodiments of the present disclosure.

FIG. 5 is a flowchart illustrating a method for providing a suggestion to a user to move a subject away from an image capturing device according to various embodiments of the present disclosure.

Referring to FIG. 5, at operation 501, a method 500 includes locating an image capturing boundary ROI in the proposed image of the image capturing device 100. In an embodiment of the present disclosure, the method 500 allows the processing module 102 to locate an image capturing boundary in the proposed image of the image capturing device 100. In an embodiment of the present disclosure, the image capturing boundary can include one or more ROIs. In an embodiment of the present disclosure, if there is no ROI, then the processing module 102 is configured to select the entire field of view as image capturing boundary. The GPS module 104 is configured to identify location of the prominent building in the field of view of the image capturing device 100. For example, the ROI can be a foreground object, such as a face, a back ground object, such as a prominent building, and the like. The processing module 102 can be configured to locate the image capturing boundary in the proposed image by initializing the image capturing device 100 with a wide zoom level. Further, the processing module 102 can be configured to locate the image capturing boundary by identifying characteristics of the proposed image. For example, the characteristics can be a geographic location, a preference obtained from the user, ambient conditions (indoor/outdoor), past actions of the user.

At operation 502, the method 500 includes computing a composition measure by determining whether the face(s) cover larger area of view than optimal area and/or whether portion of face is missing when a prominent building in background of the field of view of the image capturing device 100. In an embodiment of the present disclosure, the method 500 allows the composition measurement module 103 to determine whether the face(s) cover larger area of view than optimal area and/or whether portion of face is missing when a prominent building in background of the field of view of the image capturing device 100. For example, the composition measurement module 103 may use techniques, such as, but is not limited to, face detection, edge detection, and the like.

At operation 503, the method 500 includes suggesting the subject to move away from the image capturing device 100 if the face(s) cover larger area of view than optimal area and/or whether portion of face is missing when a prominent building in background of the field of view of the image capturing device 100. In an embodiment of the present disclosure, the method 500 allows the indication module 105 to suggest the subject to move away from the image capturing device 100 if the face(s) cover larger area of view than optimal area and/or whether portion of face is missing when a prominent building in background of the field of view of the image capturing device 100.

At operation 504, the method 500 includes determining whether the user accepted the suggestions that are provided to optimize the image capturing boundary in the proposed image. In an embodiment of the present disclosure, the method 500 allows the indication module 105 to determine whether the user accepted the indications that are provided to capture the missing portion in the proposed image.

At operation 505, the method 500 includes computing a composition measure by determining again whether face(s) cover larger area of view than optimal area and/or whether portion of face is missing when a prominent building in background of the field of view of the image capturing device 100. In an embodiment of the present disclosure, the method 500 allows the composition measurement module 103 to determine whether again face(s) cover larger area of view than optimal area and/or whether portion of face is missing when a prominent building in background of the field of view of the image capturing device 100. Further, determining whether face(s) cover larger area of view than optimal area and/or whether portion of face is missing when a prominent building in background of the field of view can be done only after the user has performed actions to capture the missing portion.

At operation 506, the method 500 includes computing an automatic optimal zoom level in response to determining that face(s) does not cover larger area of view than optimal area and/or portion of face is not cut having a prominent building in background of the field of view of the image capturing device 100. In an embodiment of the present disclosure, the method 500 allows the processing module 102 to compute the automatic optimal zoom level in response to determine that the that face(s) does not cover larger area of view than optimal area and/or portion of face is not cut having a prominent building in background of the field of view of the image capturing device 100.

At operation 507, the method 500 includes capturing the proposed image by including the missing portion with the computed automatic optimal zoom level. In an embodiment of the present disclosure, the method 500 allows the processing module 102 to capture the proposed image by including the missing portion with the computed automatic optimal zoom level.

Further, at operation 505, the method 500 includes repeating the operations from 503 if the face(s) cover larger area of view than optimal area and/or portion of face is cut having a prominent building in background of the field of view of the image capturing device 100.

At operation 504, the method 500 includes computing an automatic optimal zoom level if user did not accepts the indication provided to optimize the image capturing boundary in the proposed image. In an embodiment of the present disclosure, the method 500 allows the processing module 102 to compute an automatic optimal zoom level if user did not accepts the indication provided to optimize the image capturing boundary in the proposed image. Further, at operation 506 the method 500 includes capturing the proposed image by excluding the missing portion in the computed automatic optimal zoom level if the user did not accepts the indication provided. In an embodiment of the present disclosure, the method 500 allows the processing module 102 to capture the proposed image by excluding the missing portion in the computed optimal zoom level if user did not accepts the indication provided.

At operation 508, the method 500 includes trying zooming till automatic optimal zoom level is achieved if there is no missing portion detected in the located image capturing boundary. The method 500 allows the processing module 102 to try zooming till automatic optimal zoom level is achieved if there is no missing portion detected in the located image capturing boundary. Further, the method 500 continues from operation 506 after trying zooming till automatic optimal zoom level is achieved.

The various actions, acts, blocks, operations, and the like, in method 500 may be performed in the order presented, in a different order or simultaneously. Further, in various embodiments of the present disclosure, some actions, acts, blocks, operations, and the like, may be omitted, added, modified, skipped, and the like, without departing from the scope of the present disclosure.

Figure 6:
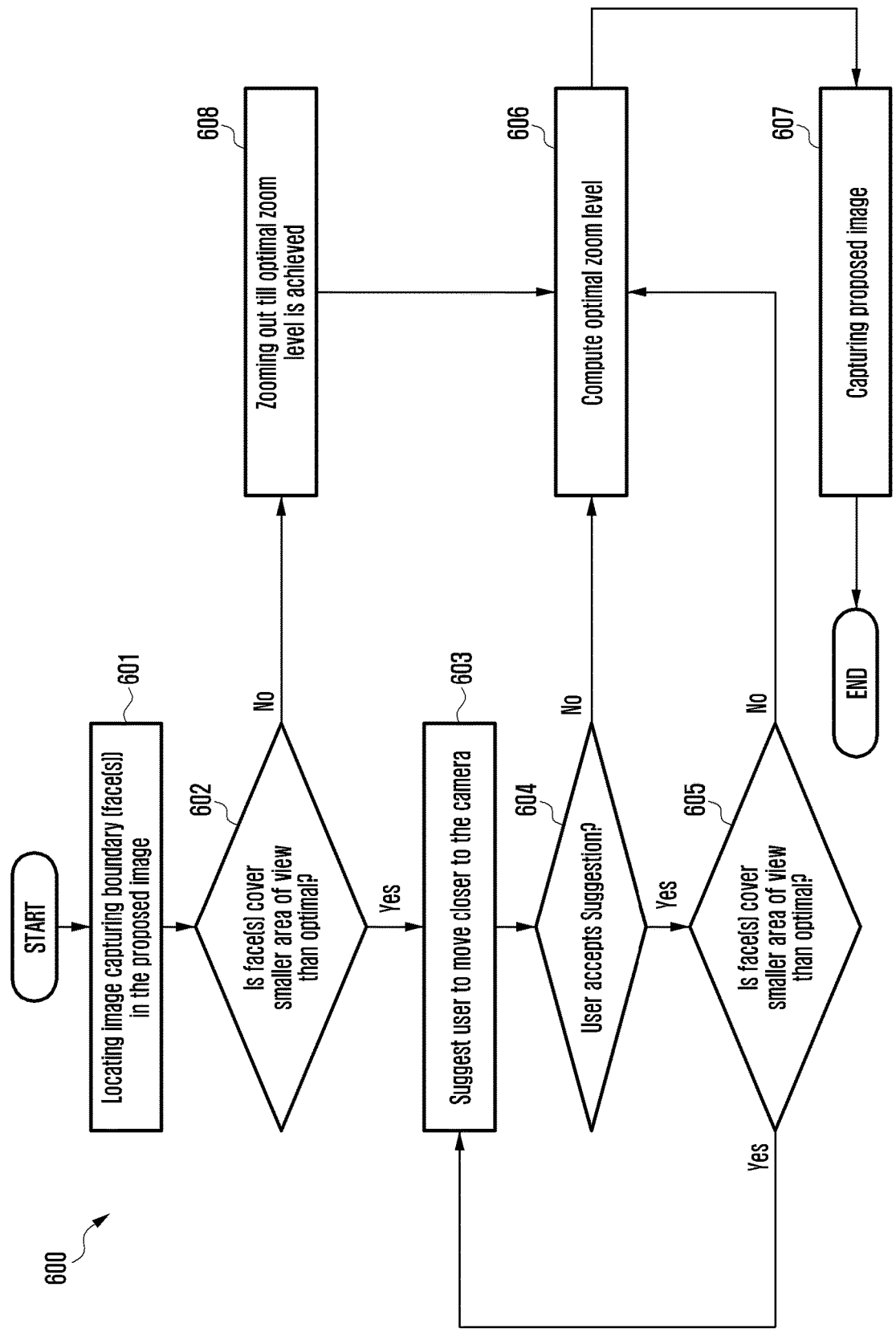
FIG. 6 is a flowchart illustrating a method for providing a suggestion to a user to move closer to a Region of Interest (ROI) according to various embodiments of the present disclosure.

FIG. 6 is a flowchart illustrating a method for providing a suggestion to a user to move closer to an ROI according to various embodiments of the present disclosure.

Referring to FIG. 6, at operation 601, a method 600 includes locating an image capturing boundary ROI in the proposed image of the image capturing device 100. In an embodiment of the present disclosure, the method 600 allows the processing module 102 to locate an image capturing boundary in the proposed image of the image capturing device 100. In an embodiment of the present disclosure, the image capturing boundary can include one or more ROIs. In an embodiment of the present disclosure, if there is no ROI, then the processing module 102 is configured to select the entire field of view as image capturing boundary. For example, the ROI can be a foreground object, such as a face, and the like. The processing module 102 can be configured to locate the image capturing boundary in the proposed image by initializing the image capturing device 100 with a wide zoom level. Further, the processing module 102 can be configured to locate the image capturing boundary by identifying characteristics of the proposed image. For example, the characteristics can be a geographic location, a preference obtained from the user, ambient conditions (indoor/outdoor), past actions of the user.

At operation 602, the method 600 includes computing a composition measure by determining whether the face(s) cover smaller area of view than optimal area of the field of view of the image capturing device 100. In an embodiment of the present disclosure, the method 600 allows the composition measurement module 103 to determine whether the face(s) cover smaller area of view than optimal area of the field of view of the image capturing device 100. For example, the composition measurement module 103 may use techniques, such as, but is not limited to, face detection.

At operation 603, the method 600 includes suggesting the subject to move closer to the image capturing device 100 if the face(s) cover smaller area of view than optimal area of the field of view of the image capturing device 100. In an embodiment of the present disclosure, the method 600 allows the indication module 105 to suggest the subject to move close to the image capturing device 100 if the face(s) cover smaller area of view than optimal area of the field of view of the image capturing device 100.

At operation 604, the method 600 includes determining whether the user accepted the suggestions that are provided to optimize the image capturing boundary in the proposed image. In an embodiment of the present disclosure, the method 600 allows the indication module 105 to determine whether the user accepted the indications that are provided to capture the missing portion in the proposed image.

At operation 605, the method 600 includes computing a composition measure by determining again whether face(s) cover smaller area of view than optimal area of the field of view of the image capturing device 100. In an embodiment of the present disclosure, the method 600 allows the composition measurement module 103 to determine whether again face(s) cover smaller area of view than optimal area of the field of view of the image capturing device 100. Further, determining whether face(s) cover smaller area of view than optimal area of the field of view can be done only after the user has performed actions to capture the missing portion.

At operation 606, the method 600 includes computing an automatic optimal zoom level in response to determining that face(s) does not cover smaller area of view than optimal area of the field of view of the image capturing device 100. In an embodiment of the present disclosure, the method 600 allows the processing module 102 to compute the automatic optimal zoom level in response to determine that the face(s) does not cover smaller area of view than optimal area of the field of view of the image capturing device 100.

At operation 607, the method 600 includes capturing the proposed image by including the missing portion with the computed automatic optimal zoom level. In an embodiment of the present disclosure, the method 600 allows the processing module 102 to capture the proposed image by including the missing portion with the computed automatic optimal zoom level.

Further, at operation 605, the method 600 includes repeating the operations from 603 if the face(s) cover smaller area of view than optimal area of the field of view of the image capturing device 100.

At operation 604, the method 600 includes computing an automatic optimal zoom level if user did not accepts the indication provided to optimize the image capturing boundary in the proposed image. In an embodiment of the present disclosure, the method 600 allows the processing module 102 to compute an automatic optimal zoom level if user did not accepts the indication provided to optimize the image capturing boundary in the proposed image. Further, at operation 606 the method 600 includes capturing the proposed image by excluding the missing portion in the computed automatic optimal zoom level if the user did not accepts the indication provided. In an embodiment of the present disclosure, the method 600 allows the processing module 102 to capture the proposed image by excluding the missing portion in the computed automatic optimal zoom level if user did not accepts the indication provided.

At operation 608, the method 600 includes zooming till optimal zoom level is achieved if there is no missing portion detected in the located image capturing boundary. The method 600 allows the processing module 102 to zoom till automatic optimal zoom level is achieved if there is no missing portion detected in the located image capturing boundary. Further, the method 600 continues from operation 606 after trying zooming till automatic optimal zoom level is achieved.

The various actions, acts, blocks, operations, and the like, in method 600 may be performed in the order presented, in a different order or simultaneously. Further, in various embodiments of the present disclosure, some actions, acts, blocks, operations, and the like, may be omitted, added, modified, skipped, and the like, without departing from the scope of the present disclosure.

Figure 7:
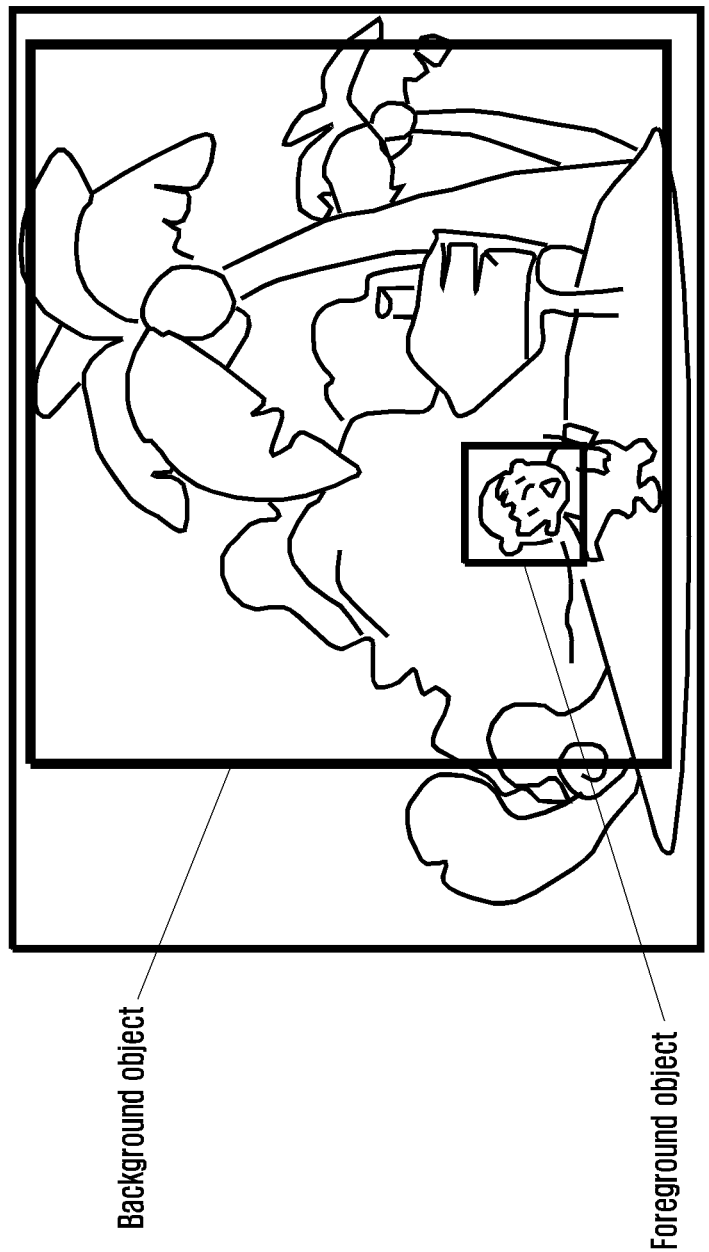
FIG. 7 illustrates an image displaying a plurality of ROIs according to various embodiments of the present disclosure.

FIG. 7 illustrates an image displaying a plurality of ROIs according to various embodiments of the present disclosure.

Referring to FIG. 7, the image capturing device 100 allows the user to select or deselect the ROI in the field of view, wherein the user selects a foreground child face along with background scenery as ROI in the field of view. The selected ROI is highlighted as bold in order to distinguish it from other regions present in the field of view.

Figure 8A:
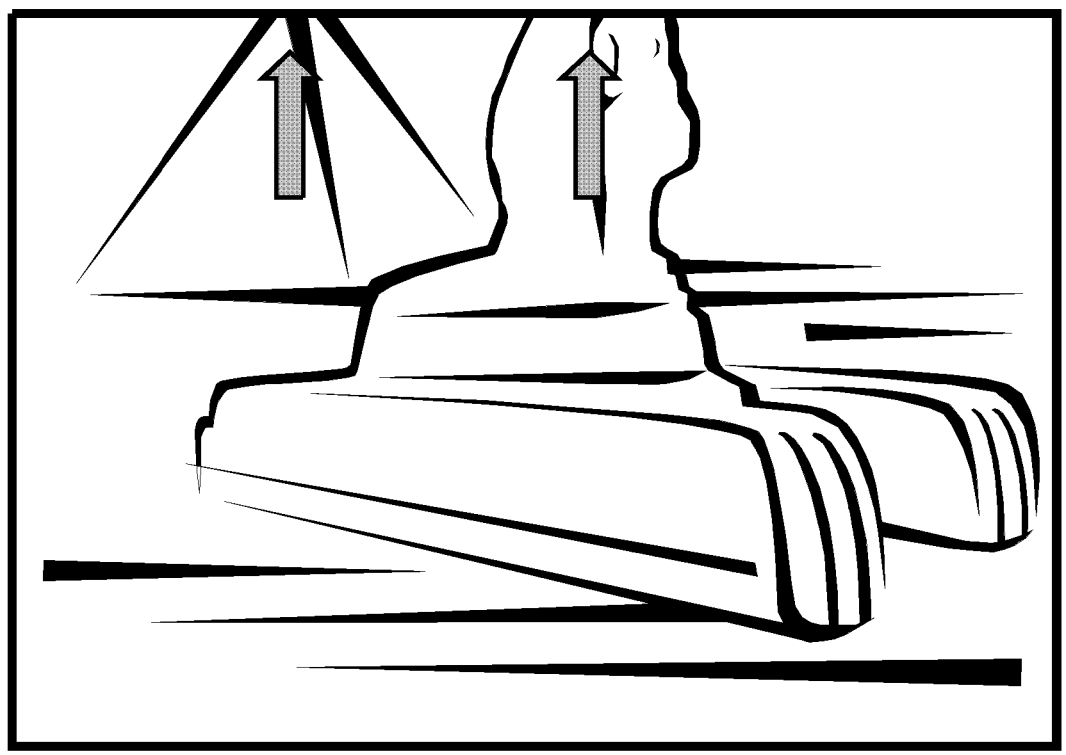
FIGS. 8A and 8B illustrate images including indications about missing portions in the images according to various embodiments of the present disclosure.
Figure 8B:
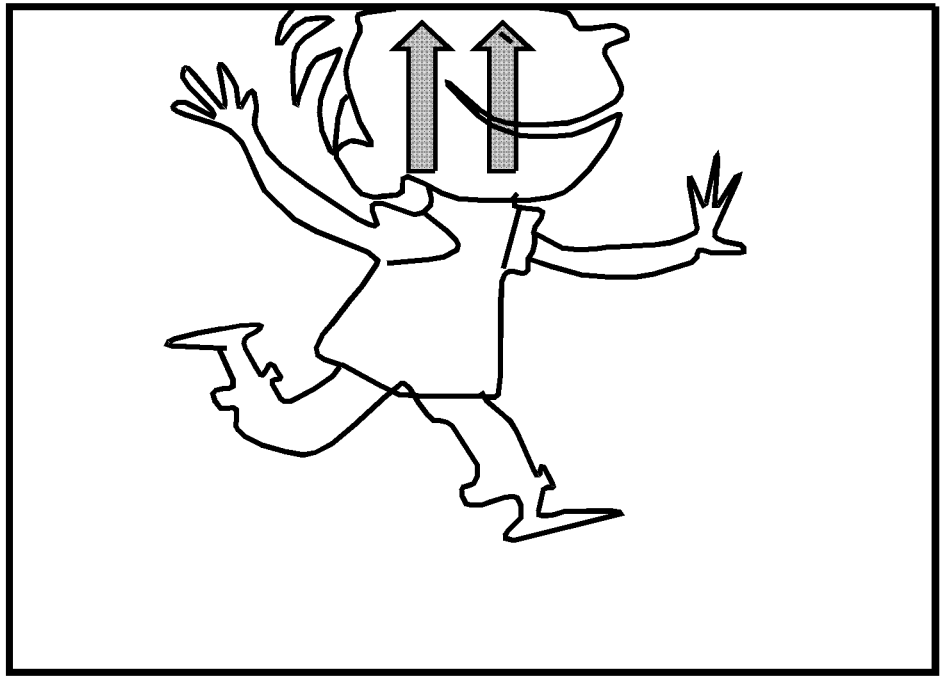

FIGS. 8A and 8B illustrate images including indications about missing portions in the images according to various embodiments of the present disclosure.

Referring to FIGS. 8A and 8B, the image capturing device 100 identifies the missing portions of the field of view and provides indications to the user by using suggestion, such as visual or graphical indications. In FIG. 8A, the image capturing device 100 identifies that the peaks in the field of view of the proposed image are missing and hence provide indications to the user. In FIG. 8B, the image capturing device 100 identifies that the head portion of a boy is missing in the field of view of the proposed image and hence provides indications to the user. In an embodiment of the present disclosure, techniques, such as, but is not limited to, edge detection, face detection may be used to identify the missing portions in the field of view of the image capturing device 100.

Figure 9A:
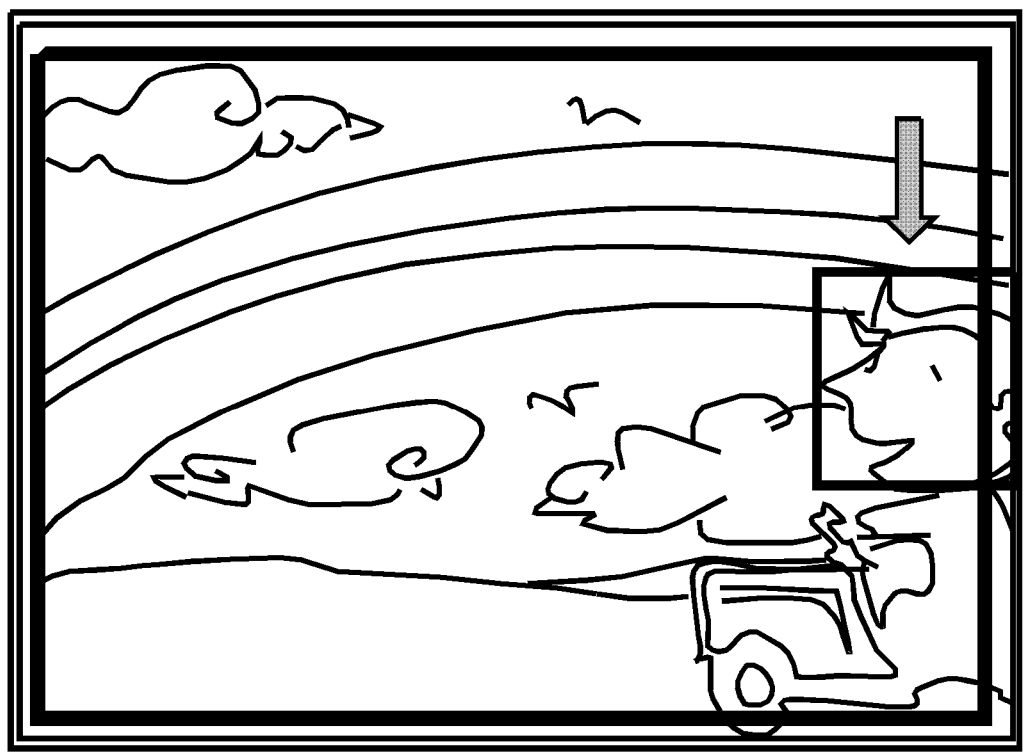
FIG. 9A illustrates an image including an indication of a missing portion of an ROI in a widest zoom level according to various embodiments of the present disclosure.

FIG. 9A illustrates an image including an indication of a missing portion of an ROI in a widest zoom level according to various embodiments of the present disclosure.

Referring to FIG. 9A, consider that the ROI in the depicted image includes both a boy on a vehicle and a landscape. The image capturing device 100 tries to provide an optimal zoom level such that the selected ROI is properly covered in the field of view of the proposed image. Further, the image capturing device 100 identifies that in the widest zoom level landscape is properly covered but the boy on the vehicle has some missing portion (head portion of the boy is cut or may not be at the ⅓rd spot) in the field of view of the proposed image. Hence, the image capturing device 100 provides indications to the user to move the ROI such that the boy on the vehicle is properly covered along with the landscape in the field of view of the proposed image.

Figure 9B:
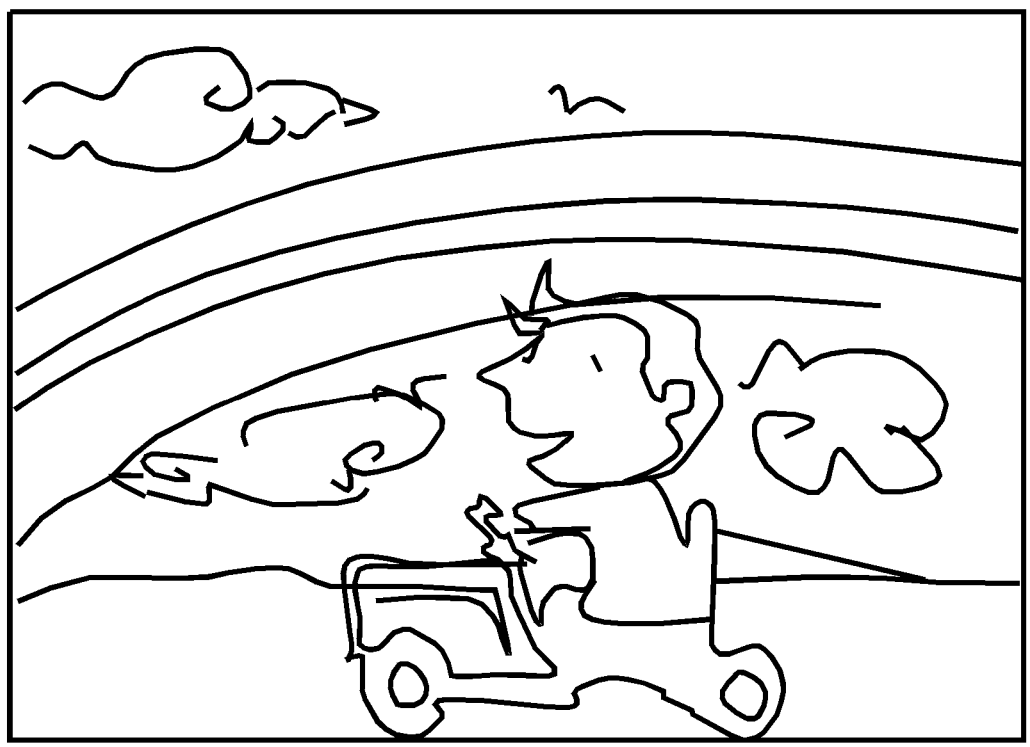
FIG. 9B illustrates an image after adjusting an ROI in response to an indication according to various embodiments of the present disclosure.

FIG. 9B illustrates an image after adjusting an ROI in response to an indication according to various embodiments of the present disclosure.

Referring to FIG. 9B, the depicted figure shows the image obtained after the ROI (a boy on the vehicle) is moved as per the indication provided by the image capturing device 100.

Figure 10A:
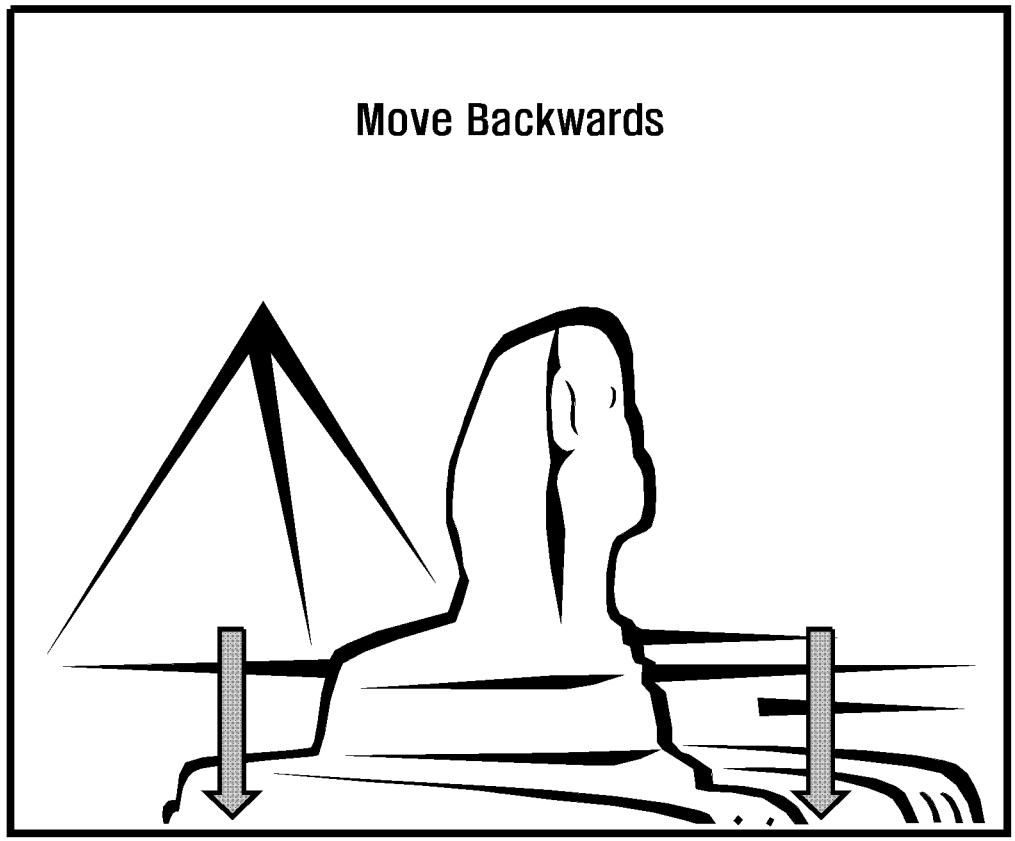
FIG. 10A illustrates an image displaying an indication of a missing portion of an ROI when the ROI is close to a bottom half of the image according to various embodiments of the present disclosure.

FIG. 10A illustrates an image displaying an indication of a missing portion of an ROI when the ROI is close to a bottom half of the image according to various embodiments of the present disclosure.

Referring to FIG. 10A, the ROI is close to an upper half of the image. Hence, in order to cover the ROI properly in the field of view, the image capturing device 100 provides indication to the user to tilt the device upwards.

Figure 10B:
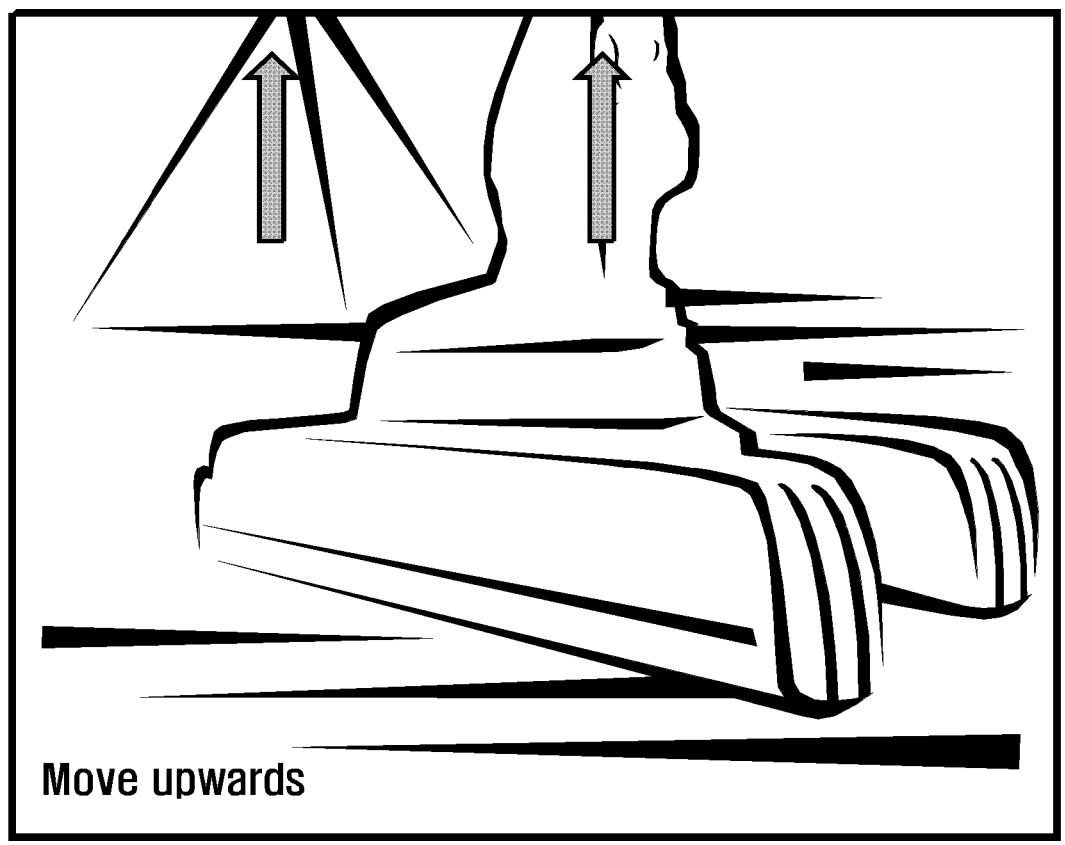
FIG. 10B illustrates an image displaying an indication of a missing portion of an ROI when the ROI is close to an upper half of the image according to various embodiments of the present disclosure.

FIG. 10B illustrates an image displaying an indication of a missing portion of an ROI when the ROI is close to an upper half of the image according to various embodiments of the present disclosure.

Referring to FIG. 10B, the ROI is close to an upper half of the image. Hence, in order to cover the ROI properly in the field of view, the image capturing device 100 provides indication to the user to tilt the device downwards.

Figure 10C:
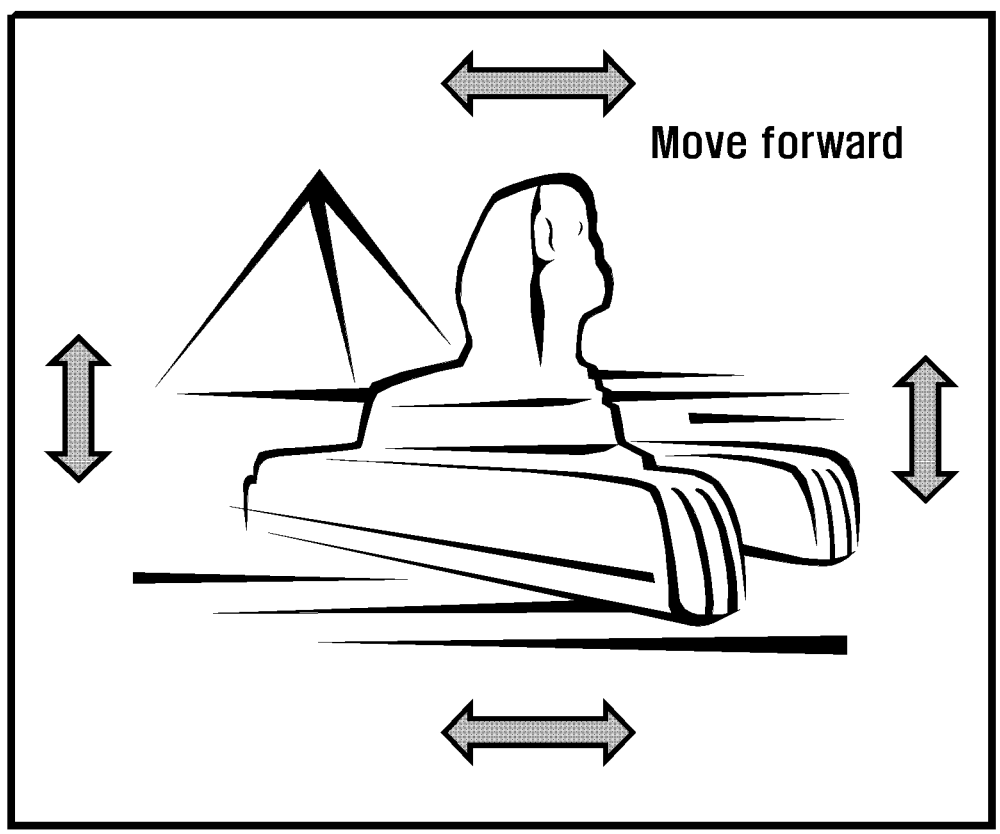
FIG. 10C illustrates an image displaying an indication of a missing portion of an ROI when an extra guard space is left at a widest zoom level according to various embodiments of the present disclosure.

FIG. 10C illustrates an image displaying an indication of a missing portion of an ROI when an extra guard space is left at a widest zoom level according to various embodiments of the present disclosure.

Referring to FIG. 10C, an extra guard space is left at the widest zoom level. Hence, in order to cover the ROI properly in the field of view, the image capturing device 100 provides indication to the user to move closer to the field of view.

Figure 10D:
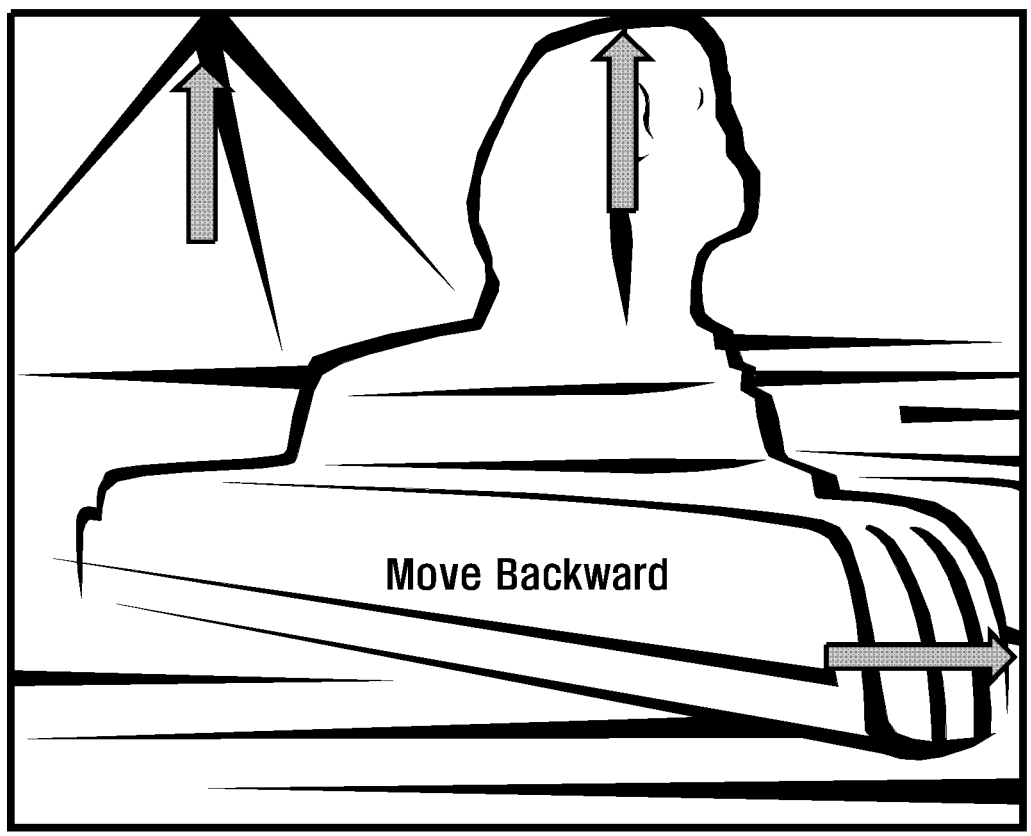
FIG. 10D illustrates an image displaying an indication of a missing portion of an ROI when the ROI is not covered in a narrow zoom level according to various embodiments of the present disclosure.

FIG. 10D illustrates an image displaying an indication of a missing portion of an ROI when the ROI is not covered at a narrow zoom level according to various embodiments of the present disclosure.

Referring to FIG. 10D, the ROI is not covered at narrow zoom level. Hence, in order to cover the ROI properly in the field of view, the image capturing device 100 provides indication to the user to move away to the field of view.

Figure 10E:
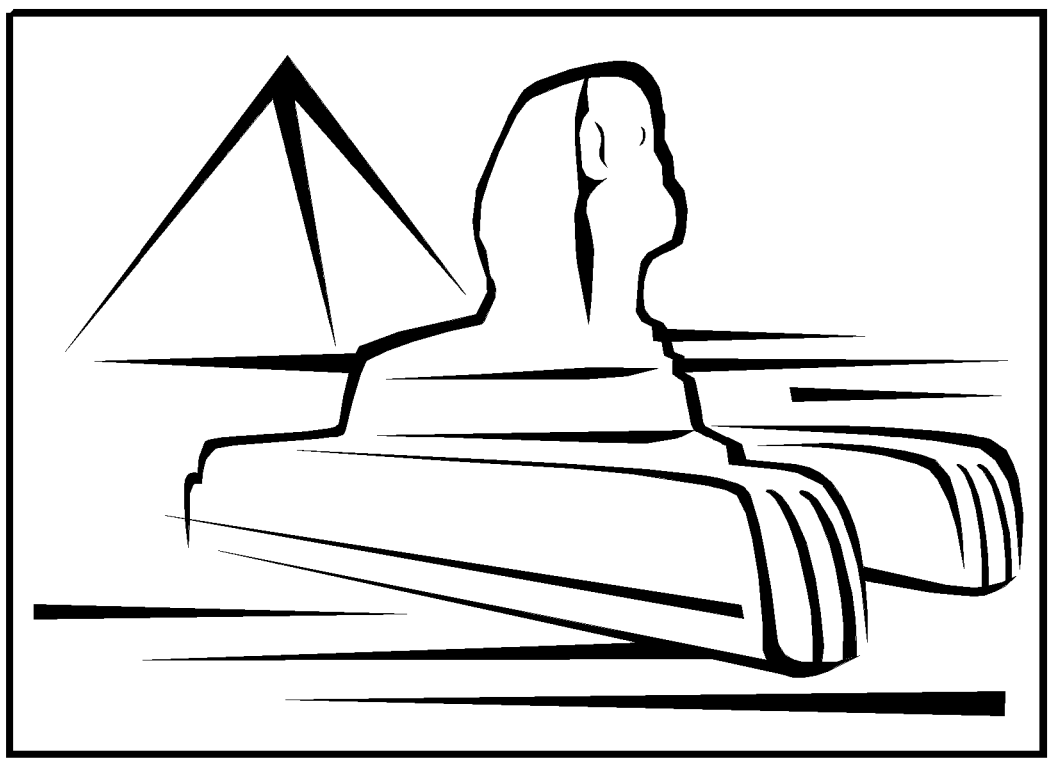
FIG. 10E illustrates images after including a missing portion of an ROI in response to an indication in each image according to various embodiments of the present disclosure.

FIG. 10E illustrates an image after including a missing portion of an ROI in response to an indication in each image according to various embodiments of the present disclosure.

Referring to FIG. 10E, the depicted figure shows the image obtained after the adjustments done as per the indications provided by the image capturing device 100.

Figure 11:
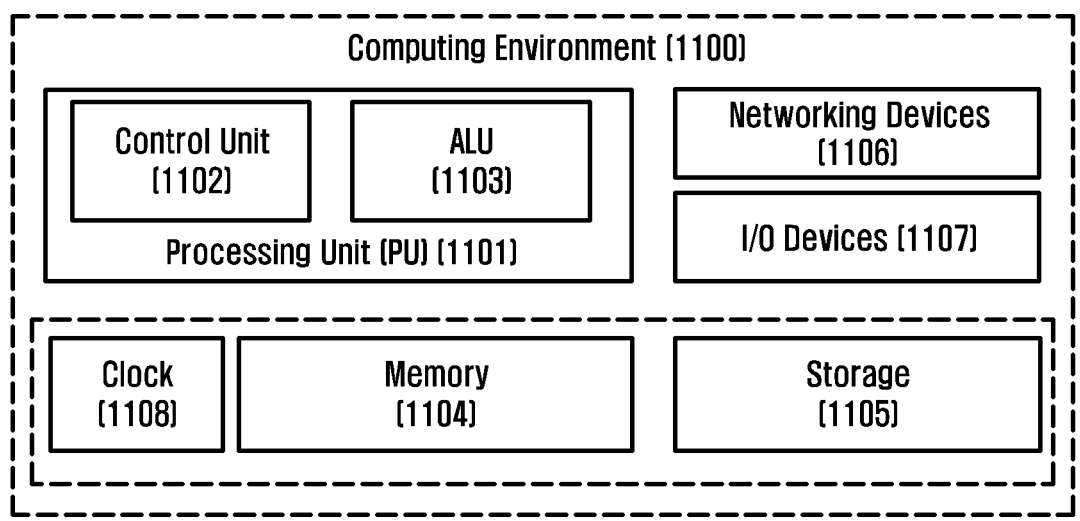
FIG. 11 illustrates a computing environment implementing a method and a system for providing an indication of a missing portion in a proposed image in an image capturing device according to various embodiments of the present disclosure.

FIG. 11 illustrates a computing environment implementing a method and a system for optimizing an image capturing boundary in a proposed image according to various embodiments of the present disclosure.

Referring to FIG. 11, a computing environment 1100 comprises at least one processing unit 1101 that is equipped with a control unit 1102 and an Arithmetic Logic Unit (ALU) 1103, a memory 1104, a storage unit 1105, plurality of networking devices 1106, a plurality Input output (I/O) devices 1107, and a clock 1108. The processing unit 1101 is responsible for processing the instructions of the algorithm. The processing unit 1101 receives commands from the control unit 1102 in order to perform its processing. Further, any logical and arithmetic operations involved in the execution of the instructions are computed with the help of the ALU 1103.

The algorithm comprising of instructions and codes required for the implementation are stored in either the memory unit 1104 or the storage 1105 or both. At the time of execution, the instructions may be fetched from the corresponding memory 1104 and/or storage 1105, and executed by the processing unit 1101.

In case of any hardware implementations various networking devices 1107 or external I/O devices 1106 may be connected to the computing environment to support the implementation through the networking unit and the I/O device unit. The various embodiments disclosed herein can be implemented through at least one software program running on at least one hardware device and performing network management functions to control the network elements.

The various embodiments disclosed herein can be implemented through at least one software program running on at least one hardware device and performing network management functions to control the elements. The elements shown in FIGS. 1 and 11 include blocks which can be at least one of a hardware device, or a combination of hardware device and software module.

The embodiment disclosed herein specifies a method for providing an automated optimal zoom level with recommendations in an image capturing device. The method allows identifying and recommending missing portions in the ROI while capturing an image providing a system thereof. The foregoing description of the specific various embodiments will so fully reveal the general nature of the various embodiments herein that others can, by applying current knowledge, readily modify and/or adapt for various applications such specific various embodiments without departing from the generic concept, and, therefore, such adaptations and modifications should and are intended to be comprehended within the meaning and range of equivalents of the disclosed various embodiments. It is to be understood that the phraseology or terminology employed herein is for the purpose of description and not of limitation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for optimizing a boundary of a first image, the method comprising:
   obtaining the first image;
   identifying at least one characteristic of the first image;
   determining an optimized image boundary of the first image to be captured, the optimized image boundary including at least one object included in the first image, based on the at least one characteristic;
   determining a zoom level, based on the optimized image boundary; and
   obtaining a second image based on the zoom level.

2. The method of claim 1, wherein the determining of the optimized image boundary comprises determining the image boundary based on a composition or an arrangement of the at least one object within the first image.

3. The method of claim 1, wherein the determining of the zoom level comprises:

displaying at least one frame for the at least one object; and determining the zoom level based on an area of the at least one object.

4. The method of claim 3, wherein the determining of the zoom level comprises determining the zoom level based on a size or a location of the area of the at least one object.

5. The method of claim 1, wherein the determining of the zoom level comprises, if a size of the at least one object within the image boundary is smaller than a predefined size or the size of the at least one object within the image boundary is greater than the predefined size, determining the zoom level such that the size of the at least one object within the optimized image boundary is equal to the predefined size.

6. The method of claim 1, wherein the at least one characteristic comprises at least one of a geographic location, a preference of a user, an operation mode of a device, ambient conditions, a composition, an arrangement, or past actions of the user.

7. The method of claim 1, wherein the second image comprises a composition including at least one of guard space around at least one region of interest (ROI), a number of objects, a size of the at least one object within the image boundary, or an attribute regarding whether there is at least one missing portion within the image boundary.

8. The method of claim 1, further comprising: initializing a device with a predetermined zoom level based on the at least one characteristic.

9. The method of claim 1, wherein the determining of the optimized image boundary comprises identifying at least one missing portion within the image boundary, and wherein the determining of the zoom level comprises determining the zoom level such that the at least one missing portion is included within or excluded from the optimized image boundary.

10. The method of claim 1, further comprising:

providing an indication for the at least one object; and receiving an input to optimize the image boundary in response to the indication.

11. A device for optimizing a boundary of a first image, the device comprising:

an integrated circuit comprising at least one processor; and at least one memory including instructions stored therein, wherein the at least one processor is configured to execute the instructions to control the device to:

obtain the first image, identify at least one characteristic of the first image, determine an optimized image boundary of the first image, the optimized image boundary including at least one object included in the first image, based on the at least one characteristic, determine a zoom level, based on the optimized image boundary, and obtain a second image based on the determined zoom level.

12. The device of claim 11, wherein the device is configured to determine the optimized image boundary based on a composition or an arrangement of the at least one object within the first image.

13. The device of claim 11, wherein the device is configured to:

display at least one frame for the at least one object, and determine the zoom level based on an area of the at least one object.

14. The device of claim 13, wherein the device is further configured to determine the zoom level based on a size or a location of the area of the at least one object.

15. The device of claim 11, wherein the device is configured to:

identify a size of the at least one object within the image boundary; and if the size of the at least one object is smaller than a predefined size or the size of the at least one object is greater than the predefined size, determine the zoom level such that the size of the at least one object is equal to the predefined size.

16. The device of claim 11, wherein the device is configured to locate the image boundary by initializing the device with a predetermined zoom level.

17. The device of claim 11, wherein the at least one characteristic comprises at least one of a geographic location, a preference of a user, an operation mode of the device, ambient conditions, a composition, an arrangement, or past actions of the user.

18. The device of claim 11, wherein the second image comprises a composition including at least one of guard space around at least one region of interest (ROI), a number of objects, a size of the at least one object within the optimized image boundary, or an attribute regarding whether there is at least one missing portion within the image boundary.

19. The device of claim 11, wherein the device is configured to:

identify at least one missing portion in the first image; and determine the zoom level such that the at least one missing portion is included within or excluded from the optimized image boundary.

20. The device of claim 11, wherein the device is configured to:

provide an indication for the at least one object in the first image; and receive an input to optimize the image boundary in response to the indication.

* * * * *